(12) United States Patent
Jett

(10) Patent No.: US 6,684,633 B2
(45) Date of Patent: Feb. 3, 2004

(54) EXHAUST DEVICE FOR TWO-STROKE INTERNAL COMBUSTION ENGINE

(76) Inventor: Marion Barney Jett, 8802 Heather Cir., Houston, TX (US) 77055

( * ) Notice: Subject to any disclaimer, the term of this patent is extended or adjusted under 35 U.S.C. 154(b) by 0 days.

(21) Appl. No.: 09/798,383

(22) Filed: Apr. 27, 2001

(65) Prior Publication Data

US 2003/0005687 A1 Jan. 9, 2003

(51) Int. Cl.[7] .................................................. F02B 27/02
(52) U.S. Cl. ........................................................ 60/312
(58) Field of Search ........................ 60/312, 287, 313, 60/314

(56) References Cited

U.S. PATENT DOCUMENTS

| | | | | |
|---|---|---|---|---|
| 3,577,728 A | * | 5/1971 | Brimer | 60/264 |
| 3,633,343 A | * | 1/1972 | Mark | 55/323 |
| 3,644,098 A | * | 2/1972 | De Palma et al. | 23/288 F |
| 3,835,645 A | * | 9/1974 | Zoleta | 60/274 |
| 4,231,763 A | * | 11/1980 | Baisden | 55/DIG. 30 |
| 4,649,703 A | * | 3/1987 | Dettling et al. | 60/311 |
| 4,941,545 A | * | 7/1990 | Wilcox et al. | 181/272 |
| 5,144,797 A | * | 9/1992 | Swars | 60/299 |
| 5,783,782 A | * | 7/1998 | Sterrett et al. | 181/272 |

FOREIGN PATENT DOCUMENTS

JP          357198310      * 12/1982

* cited by examiner

Primary Examiner—Thomas Denion
Assistant Examiner—Diem Tran
(74) Attorney, Agent, or Firm—Michael J. Caddell

(57) ABSTRACT

The present invention discloses a compact efficient exhaust handling device that is particularly advantageous for use with small two-stroke, piston-type internal combustion engines, which device provides both exhaust scavenging and charge densification in the cylinder of the engine by utilizing a first muffler section formed in a helical or wrapped configuration, and a muffler expansion chamber also formed in a wrapped configuration, and axially displaced from the first section.

9 Claims, 2 Drawing Sheets

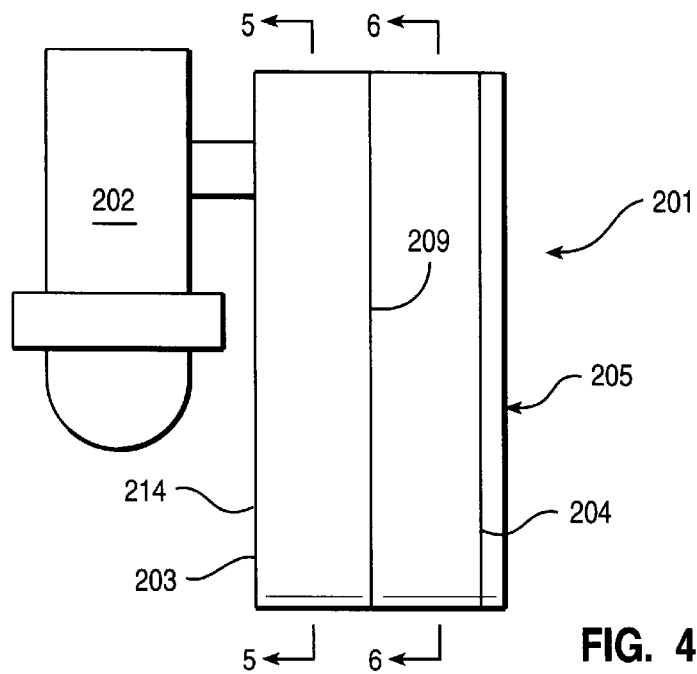
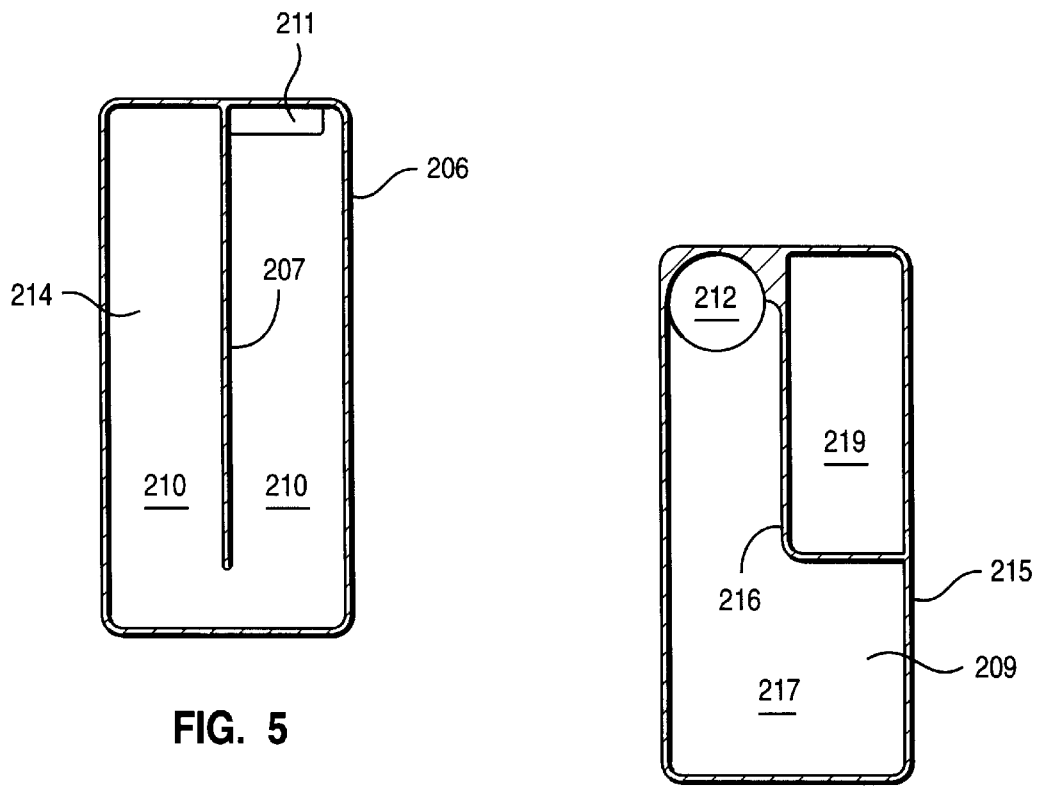

EXHAUST DEVICE FOR TWO-STROKE INTERNAL COMBUSTION ENGINE

FIELD OF THE INVENTION

The present invention relates to a device for receiving the exhaust gas output of a reciprocating piston internal combustion engine, and more particularly discloses a muffler assembly that is particularly advantageous for use with a two-stroke gasoline engine, which assembly provides both an exhaust scavenging function and a supercharging function, and in addition, comprises a low profile and compact design.

BACKGROUND OF THE INVENTION

This invention discloses an exhaust gas handling assembly for an internal combustion engine, which is especially useful in small two-stroke gasoline engines such as in radio-controlled airplanes and wheeled vehicles for ground travel, such as motorcycles and all terrain vehicles. The device is commonly referred to as a muffler, but this is a term that is too restrictive for all the functions performed by the device. While the device does serve to muffle or dampen the noise of combustion in such internal combustion engines, it also serves at least two other critical functions, exhaust scavenging and fuel-charge densification.

The present invention has been found to be particularly advantageous when used on a two-stroke, internal combustion, piston and crankshaft type engine which burns a volatile fuel such as gasoline and/or alcohol, and which utilizes valving consisting of ports formed through the wall of the piston cylinder, controlled by movement of the piston within the cylinder to alternately expose and cover up said ports.

A typical two-stroke engine has one or more intake ports formed through each cylinder wall and one or more exhaust ports formed through the cylinder wall, usually located on the opposite side of the cylinder from the intake ports. These ports are positioned such that the piston opens and closes them in a carefully controlled sequential manner to allow intake and exhaust of the fuel/air mixture and the products of combustion, respectively. Many such engines pump the fuel/air mixture through the crankcase of the engine into the intake port in the cylinder wall.

During a normal intake/compression/combustion/exhaust cycle of the two-stroke piston-cylinder combination, when the exhaust port is opened by movement of the piston away from its blocking position over the port, a high-pressure exhaust gas pulse starts down the exhaust tube. The piston continues down and the exhaust pressure bleeds off into the tube. This occurs at around 90–110 degrees from piston Top Dead Center (TDC). At about 15–25 degrees later, the intake ports on the other side of the cylinder are exposed by the piston, and, because of crankcase compression, a fuel/air mixture begins to flow through the intake ports and into the cylinder while exhaust gas is still moving out the exhaust ports. After a small fraction of a second, the pressure pulse moving down the exhaust tube reaches an open area, or expansion chamber, and this starts an expansion wave back toward the exhaust ports. This expansion wave creates an action at the exhaust ports, which serves to draw additional flow of exhaust from the cylinder, including a portion of the new fuel/air charge entering through the intake ports.

As the expanding exhaust pulse reaches the end of the expansion chamber, it impinges the narrowed end of the tube at the downstream end of the chamber and is compressed, thereby creating a strong compression wave that moves back up the tube to the exhaust port. This results in some of the escaped fuel/air charge being pushed back into the cylinder before the piston closes the exhaust ports, thus achieving the desired charge-densification effect in the cylinder.

The "tuning" of the muffler is dependent upon the length and volume of the expansion chamber and its distance down the tube from the exhaust ports. This chamber effectively locates the positions of the expansion part of the tube, and the compression portion. The remaining portion of the exhaust tube downstream from the expansion chamber has little effect on the "tuning" of the exhaust.

Some exhaust mufflers, which are also commonly called "tuned pipes" or "tuned exhaust extractors", which are currently available commercially for small two-stroke engines are sufficiently "tuned" to allow optimum scavenging of exhaust from the cylinder of the engine and a charge-densification of the incoming fuel/air mixture. This occurs by the advantageous utilization of the above-described impulse/compression wave nature of the exhaust muffler. There are also mass effects involved in exhaust processes, i.e., the volume of exhaust gas in a system does not move through the pipe with a smooth, linear velocity. The velocity rises and falls along with the pressure waves, so that being "in tune" with these differences amplifies the pressure differences. The expansion portion of the exhaust gas wave moving out of the cylinder, through the exhaust valve, and down the muffler tube serves to establish a subnormal pressure condition just outside the exhaust valve, which aids in removing additional combustion products from the cylinder while the cylinder interior is exposed to the open exhaust port. Shortly thereafter, the compression wave passing back up the muffler to the cylinder serves to "supercharge" the incoming fuel/air charge that has begun to exit the open exhaust port by forcing the charge back through the exhaust port and into the cylinder, thereby increasing the density of the fuel/air mixture in the cylinder before the compression and combustion cycles are achieved.

Unfortunately, prior art muffler devices for small two stroke gasoline engines offer chamber designs that are many times longer than the diameter of the cylinder in which the fuel/air mixtures are combusted. The most prevalent of such muffler devices commercially available for two-stroke gasoline engines suffers from having a length as much as 6–30 times the diameter of the cylinder it is attached to. The specific length of the tuned pipe is primarily a function of the RPM at which the engine designer wishes to "tune" the system. Often a particular torque curve is desired for an optimum match-up with the particular airframe chosen, and this can be achieved by designing the system to be longer or shorter. A short length tube will be utilized for a high-RPM, low torque engine, and a long length tube will be used for a low-RPM, high torque engine. This length is used to create the compression/expansion wave actions referred to above which establish the scavenging and densification functions previously described. If such muffler chamber is not properly sized, the two-stroke engine exhaust will not be "tuned" and performance of the engine will suffer drastically.

However, when the muffler chamber is properly sized for optimum performance, it results in a muffler having a physical presence that is many times larger than the entire engine to which it is attached. In the world of small engines, this is very undesirable for several reasons. One reason that such bulky and cumbersome exhaust device is undesirable is the ugly aesthetics that it presents. The present commercially available muffler is a long, cigar-shaped tube that must extend down the side of the vehicle to which it is attached.

For those who desire authenticity in the appearance of their small gasoline-powered vehicles, the presence of such a bulky and obvious attachment, often extending down the full length of the airplane or land vehicle on which it is used, greatly mars the owner's enjoyment of the vehicle. This is particularly true in the field of radio-controlled (RC) airplanes and cars.

In addition to the aesthetically unpleasant feature of current muffling devices, they also are very aerodynamically inefficient, causing unbalanced weight and drag on the vehicles, especially on the RC airplane.

Commercially available "tuned" mufflers for small two-stroke engines generally comprise a long, cigar-shaped tube/chamber combination that begins with a small diameter next to the exhaust port of the engine cylinder. At this point the cross-sectional area of the muffler may be approximately the same size as the exhaust port of the small engine. As you progress down the tube of the muffler, the cross-sectional area increases several-fold to form the expansion chamber of the muffler to create the expansion wave which moves backward down the muffler to the exhaust port and provides the scavenging function mentioned previously. This serves to "suck" the remaining exhaust gases from the cylinder while also creating a low-pressure condition in the cylinder that aids in inducting a greater fuel/air charge through the intake port which is open at the same time.

Further down the muffler, the cross-sectional area is narrowed significantly to create the compression wave that then moves back up the muffler to the cylinder and serves to push back into the cylinder the portion of unburned fuel/air charge that had managed to flow partly out the exhaust port and into the muffler, thereby accomplishing the densification or "supercharging" effect of the muffler. When these two chamber sections, i.e. the expansion chamber and the compression chamber, are located in tandem along the same axis, the device must by necessity be very long, i.e., many times the diameter of the cylinder to which it is attached. This creates a muffler system that is sometimes longer than the vehicle on which it is used. This prior art exhaust device can thus be characterized as a Total-Axial-Flow muffler system.

A second prior art muffling device that is commercially available is similar to the "tuned pipe" system described above but adds a further element of a concentric annular outer shell which "wraps" around the tuned muffler and goes from the exit end of the first exhaust pipe, forward to the beginning of the inner pipe to obtain a dual concentric pipe effect. This creates an outer chamber around the inner tube, which chamber serves to act as an expansion/compression wave generating chamber. While this has the effect of providing the desired scavenging and densification effects on the engine and is shorter in length, this second device suffers from the disadvantage of being larger in diameter and less efficient than just the tuned pipe style of muffling system, thus detracting from the aesthetics and streamlining of the vehicle it is used on.

SUMMARY OF THE INVENTION

The present invention solves the problems of the prior art exhaust systems described above by providing a muffler device that is not total-axial-flow with respect to exhaust gases, but instead folds the several distinct functional aspects of the "tuned" muffler in on one another in a combined axial-circumferential flow, to greatly reduce the length and size of the device and thereby provide a muffler that can be secured entirely inside the cowling, cabin, or cockpit of the vehicle on which it is used. Thus the present invention presents a "tuned" muffler that is aesthetically pleasing and which eliminates aerodynamic drag on the vehicle.

The invention also teaches a tuned exhaust system for an internal combustion engine having at least one exhaust port for ejecting spent exhaust gases, said tuned exhaust system comprising:

A. a first enclosed exhaust flow channel adapted for attachment to an internal combustion engine, said first flow channel having at one end thereof an inlet port adapted for receiving exhaust gases from the exhaust port of an engine, an extended flow tube coiled in a first radial plane containing said inlet port, and an outlet port at the opposite end of said flow channel; and, B. an expansion channel attached to said first flow channel and having an extended chamber folded into a second radial plane axially displaced from said flow channel, and having an inlet opening communicating with said flow channel outlet port, and an exhaust opening located an extended distance down said expansion channel from said inlet opening and adapted to exhaust gas flow into the atmosphere.

BRIEF DESCRIPTION OF THE DRAWINGS

FIG. 4 is a front schematic view of a second embodiment of the invention;

FIG. 5 is a side sectional view of the embodiment of FIG. 4, taken at line 5—5; and, FIG. 6 is a side sectional view of the second embodiment taken at line 6—6 of FIG. 4.

DESCRIPTION OF THE PREFERRED EMBODIMENTS

Figure 1:
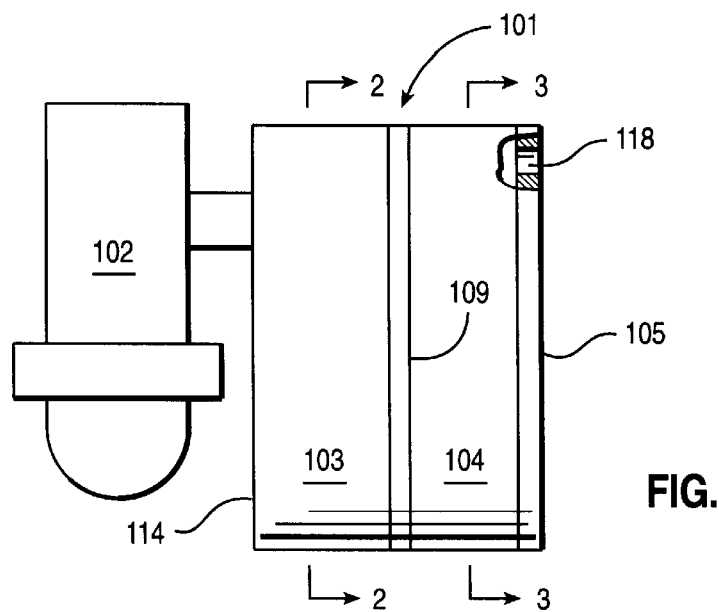
FIG. 1 is a front schematic view of the muffler device of the present invention.
Figure 2:
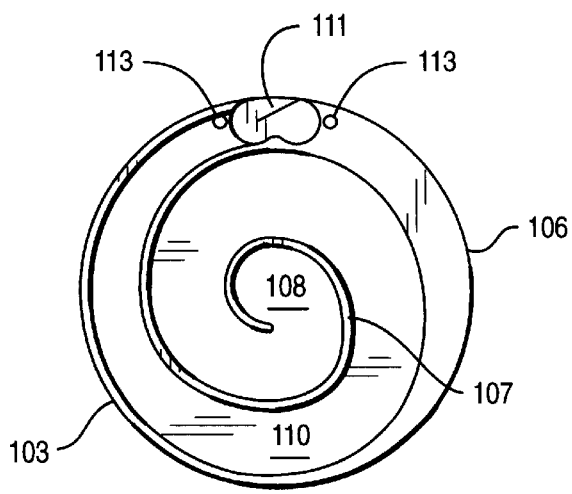
FIG. 2 is side sectional view of the invention taken at line 2—2 of FIG. 1.
Figure 3:
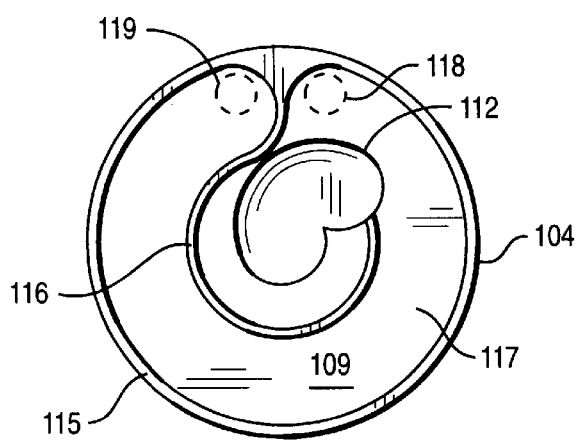
FIG. 3 is a side sectional view of the invention taken at line 3—3 of FIG. 1.

Referring to FIGS. 1–3, and more particularly FIG. 1, the muffler device 101 is illustrated as it appears when viewing from the front of the engine 102 to which it is attached. Muffler 101 consists of three basic modules, the pipe section 103, the can section 104, and the cover plate 105. As illustrated in this embodiment, the muffler 101 is cylindrically shaped, but as illustrated in the second embodiment herebelow, this shape could just as well be any geometrical shape desired, including square and rectangular.

FIG. 2 is a sectional end view of the pipe section 103 taken at line 2—2 of FIG. 1. The pipe section 103 consists of a cylindrical outer housing shell 106 and a helical divider wall 107 spiraling inward from the outer wall 106 to a central chamber 108. The axial height of spiral wall 107 is equivalent at all points to the height of shell 106, so that the addition of the flat inner wall 109 of can section 104 against pipe section 101 serves to seal against the entire length of divider wall 107, thereby creating a sealed spiral passage 110. The only openings to passage 110 are the inlet opening 111 communicating with the exhaust valve of engine 102, and an exhaust outlet opening 112 formed in wall 109 of can section 104. One or more mounting holes 113 are formed through the left wall 114 of pipe section 103 for mounting the muffler device 101 to the engine 102, allowing the passing therethrough of mounting screws or bolts from the wall section 114 to the engine block of engine 102.

FIG. 3 is a side sectional view of the can section 104 of the muffler device 101, taken at line 3—3 of FIG. 1. Can section 104 consists of cylindrical housing or shell 115 which is machined for tight-fitting sealing engagement with housing 106 of pipe section 103, a flat wall section 109 adapted to seal off and create the enclosed spiral passage 110 in pipe section 103, and a chamber forming divider wall 116 which is attached to wall section 109 and is arranged to seal against cover section 105 to form an expansion and compression chamber 117. An exhaust inlet opening 112 is formed through wall 109 to communicate with passage 110 in pipe section 103, and is generally located at about the center of section 104. The opening between pipe section 103 and can section 104 must be at or near the end of the spiral passage 110 for proper operation, i.e., at the center of the pipe section, designated as outlet 112. The opening from the expansion chamber 117 to the atmosphere can be located through cover plate 105 so that it aligns with either end of expansion chamber 117. In FIG. 3 this is indicated in phantom at 118 to show the location of the exhaust port with respect to opening 112. An alternate location for the exhaust port in the cover plate 105 is also indicated in FIG. 3 at 119. Either location, 118 or 119, allows exhaust gas to be flowed out of the muffler device while still taking full advantage of the expansion/compression chamber 117. However, the exact location of this port is not critical to the operation of the invention, because changing the location serves mainly just to change the back pressure that is created within the exhaust assembly and to also vary the temperatures reached within the exhaust assembly. Also, the size of port 118 determines pressures, temperatures and mass flow effects within the entire exhaust system. One skilled in the art, with only a minimum of trial and error, will be able to vary the size and location of port 118 to optimize the particular exhaust effects desired, depending upon the application of the engine on which the system is to be installed, and depending on the RPM range at which the operator wishes power from the engine to be optimized.

A cover plate 105 engages with can section 104 to enclose the chamber area 117 by sealing with housing 106 and having a flat wall section 109 that engages the top of divider wall 116. An exhaust port 118 is formed through the wall of cover plate 105 and communicates with compression/expansion chamber 109 to allow spent exhaust gases to exit the muffler assembly into the atmosphere.

An assembly hole can be formed centrally in all of the three sections, 102, 104, and 105 so that a bolt, screw, pin, or other elongated fastening device may be passed through the separate assembly sections to secure them together into a single assembly 101. Alternatively, the separate sections could be formed so that they telescope into each other, with telescoping sections along the outer periphery of each section that can be fastened securely by threads formed on each section, by fusion means such as welding, or by fasteners passing through the telescoped outer walls where they overlap.

In addition to the above described structure of the three elements consisting of the pipe section 103, the can section 104, and the cover plate 105, it is possible to manufacture the assembly by forming the can section and the cover section as a single integral part, by making the flat wall section 109 of the can section as a separate individual divider plate that is inserted between the pipe section and the can section and held there by pressure from these two adjacent sections, and/or by one or more fasteners as described hereinabove.

Further modifications of the invention from the specific embodiment described above can be achieved without changing the efficiency and operation of the invention. For example, instead of having the pipe section and the can section located with respect to each other so that they are coaxial and concentric, it is possible to have the sections located so that they are still touching each other while being axially displaced from each other, but not concentric, as long as the outlet port from the pipe section still communicates with the inlet opening of the can section. It is possible to slide one section radially outward from the other and still maintain contact between the two sections sufficient to allow communication between the outlet port of one with the inlet port of the other, while maintaining the operation and efficiency of the invention, so long as they are still axially displaced one from the other and their diametral planes are still relatively parallel to each other and displaced axially.

The muffler assembly 101 may be made of any structural metal which is light, strong, and temperature-resistant, such as aluminum, steel, brass, copper, or alloys of these and other metals. Likewise, the assembly could be manufactured from a strong temperature-resistant thermosetting polymer known to those skilled in the thermosetting plastics art. Or, various parts of the assembly could be made of different metals, alloys, or polymers from other parts of the assembly without going beyond the limits of the herein described invention.

FIGS. 4–6 illustrate a second embodiment of the invention in which the overall general shape of the muffler assembly 201 is a rounded-corner rectangular shape rather than that of a right circular cylinder as disclosed in the first embodiment. FIG. 4 illustrates a schematic diagram of the muffler assembly 201 which consists of a rectangular pipe section 203 to which is attached a matching rectangular can section 204, closed off by a rectangular cover plate 205. The muffler is attached to the exhaust port of an internal combustion engine 202.

FIG. 5 is a sectional side view of the pipe section 203, which is the view taken at line 5—5 of FIG. 4. In this figure the pipe section 203 is formed in a similar fashion to the pipe section 103 of the first embodiment, in that it consists of an outer housing or shell section 206 extending axially with the exhaust flow from engine 202. Inside housing 206 is a barrier wall 207 extending down a substantial portion of the vertical length of section 206 and forming an exhaust flow channel 210 which is a U-shaped closed passage created by the sealing of wall 209 of can section 204 against wall section 207 and barrier wall 207. An inlet port 211 is formed through wall 214 of the pipe section to communicate with the exhaust port of the engine to which the muffler 201 is attached.

FIG. 6 illustrates a side sectional view of the can portion 204 of the muffler of the second embodiment, which view is taken at line 6—6 of FIG. 4. Can section 204 has an external housing shell 215 which is a constant-height rectangular wall forming the external shape of the can section 204. Shell 215 is attached to a flat can wall section 209 and forms internal expansion/compression chamber 217 therein. This chamber is made into an ell shape by the addition of internal wall section 216 which is attached to can wall 209 and is of equal height to housing wall 215.

A closed chamber or dead space 219 results from the ell shape of chamber 217. An inlet port 212 is formed through wall 209 of can section 204 and communicates with U-shaped passage 210 of pipe section 203. Preferably, inlet port 212 is located on the opposite side of barrier wall 207 from inlet port 211 coming from the exhaust valve of the engine. A rectangular cover plate 205 is attached to the can section 204 by sealing engagement of the outer edge of cover plate 205 with housing shell 206 of the can section. Also, cover plate 205 contacts the full length of barrier wall 216 to enclose chambers 217 and 219. An exhaust port 218 is formed through the wall of cover plate 205 to exhaust spent gases to the atmosphere. As with the first embodiment, the exact location of port 218 is not critical to the operation of the invention, but allows the designer to vary pressures and temperatures within the exhaust system.

Typical Operation

In typical operation, an exhaust gas pulse enters the exhaust entry port 111 of pipe section 103 from the opened exhaust valve of engine 102. The gas pulse enters the spiral passage 110 of the pipe section and traverses down this passage toward the outlet port 112 formed in the can section. The exhaust gas pulse flows through the port 112 and reacts with the volume of the expansion/compression chamber 117, with the immediate result that the volume of the gas pulse is rapidly expanded, thus creating an expansion wave that moves back up the spiral passage 110 to provide the needed scavenging of the engine cylinder through the still-open exhaust valve and port 111.

After the expansion pulse has moved around the full length and volume of chamber 117 it hits the ends of the chamber, thereby creating a compression wave that then travels back through the chamber 117, port 112, up the spiral passage 110, and into the exhaust valve of the engine cylinder, thus providing the charge-densification effect previously mentioned.

The entire system is "tuned" according to the engine designer's desires by altering the length and/or volume of the individual chambers. The volume can be altered by making the pipe section or the can section, or both, wider or narrower in the axial direction. The lengths of the passages can be altered by changing the degree of curvature and length of the spiral wall section 107, and/or the degree of curvature and length of wall section 116. Volume and length of all the internal passages can be altered by increasing the radial diameter of the entire device 101, thereby simultaneously increasing the length of the internal passages while also increasing their volumes.

The skilled mechanic in the art of muffler or "expansion chamber" design for two-stroke engines, such as those used in motorcycles and airplanes, can design the length and diameter of the internal passages of the muffler to obtain the particular results desired of the particular engine being "tuned" by the exhaust system. This requires that the designer know the speed at which sonic waves travel through the expansion chamber of the muffler device. This in turn depends upon the temperature of the exhaust gas moving down the chamber. Exhaust gases exit the combustion chamber at approximately 1200 degrees F. and drop to around 800 degrees F. at the outlet pipe. Because of the cooling from expansion in the chamber, they can be cooled to as low as 500 degrees or lower before reaching the final outlet pipe. Critical dimensions, besides the length and diameter of the expansion chamber, include the rate or angle of divergence of the expansion chamber wall section, and the cross-sectional shape of the chamber. Also critical is the angle of convergence in the compression section at the end of the expansion chamber.

These factors are more particularly spelled out for the skilled artisan in publications available commercially, such as the book "TWO STROKE TUNER'S HANDBOOK" by Gordon Jennings, copyright 1973 by H. P. Books, Box 5367, Tucson Ariz.; book number 41-ISBN 0-912656-41-7; the contents of which are incorporated herein by reference. It should be noted that according to this reference, the design of any muffler device for a two-stroke engine is an exercise in compromise, because of the many different end results that can be achieved by the engine designer. For example, some exotic racing engines are tuned to obtain a peak horsepower rating in a very narrow RPM range because of their close-ratio, multiple speed transmissions which are designed to keep the engine revved up and operating continually at a desirable high RPM. Alternatively, other two-stroke engines, because they do not enjoy the advantage of being able to "shift gears" while in operation, may need to utilize a muffler system with an expansion chamber designed to optimize the average power output over a broader range of RPM.

For example, the angle of divergence of the expansion chamber wall, called the "diffuser angle" determines the width of the engine "power band". In a conventional "cigar-tube" expansion chamber, a diffuser angle of greater than 8 degrees creates a short-duration wave that results in maximum power at peak RPM. A more gradual taper, less than 8 degrees, spreads the power band out over a broader range of RPM. Likewise, the compression taper at the end of the expansion chamber has a similar but less dramatic effect on the power band of the engine. Thus it can be seen that the dimensions and angles of the expansion chamber section of the muffler of the present invention can be optimized in several different configurations to fit the designer's power goal, depending upon the desired final result of the engine designer, by using a very small amount of trial and error.

In the second embodiment of the invention, these same changes can be used to obtain the same variations in dimensions and capacities. In addition, in the second embodiment, the length and volume of the expansion/compression chamber 217 can be altered by increasing or decreasing the volume of the dead space 219.

Thus, the present invention has provided both the scavenging and charge-densification effects necessary to have an efficient "tuned" exhaust system. These are the same functions provided by the extensively long and bulky prior art muffling devices; however, the present invention provides these features in a compact muffler that can be completely contained in the cowling, cabin, or cockpit of the airplane or ground vehicle to which the muffler is attached.

It has been shown how the present invention has solved the problem of the prior art devices by providing a compact and efficient "tuned" exhaust muffler assembly that is concealable within the confines of the vehicle on which the device is being used.

While multiple embodiments of the invention have been illustrated, it is to be understood that the invention is not confined to the precise disclosure, and it will be apparent to those skilled in the art that various changes and modifications can be made in the invention without departing from the spirit of the invention or from the scope of the appended claims. For example, whereas the device is illustrated in cylindrical and rectangular form, it is clear that other geometric shapes such as triangular or elliptical could also be used advantageously. Also, whereas it is noted that the material of which the device is manufactured is a strong light metal or thermosetting plastic, it is clear that other materials such as carbon fiber material could also be used advantageously.

What is claimed is:

1. An exhaust handling system for an internal combustion engine adapted to receive the exhaust gases from the combustion cylinder of such engine and to provide exhaust gas scavenging and fuel-charge densification in said engine, said exhaust handling system comprising:

A. a first enclosed housing attachable to an exhaust port of an internal combustion engine, containing a radially extending exhaust channel formed therein, said channel communicating between an inlet opening of said housing and arranged to communicate with the exhaust port of an internal combustion engine, and an outlet port at the opposite end of said channel; and, B. a second enclosed housing attached to said first housing and axially displaced therefrom, said second housing comprising an expansion chamber therein formed by an internal chamber wail, said expansion chamber having an inlet opening at one portion thereof communicating with said outlet port of said first housing and an exhaust port formed therein; and, C. wherein said first housing is generally circular in shape and said exhaust channel is formed therein by a coaxial helical wail section of the same axial height as said first housing, with said inlet opening being at the outer portion of said helical wail section, and said outlet port being located at approximately the center of said first housing.

2. The exhaust handling system of claim 1 wherein said second housing is of the same external shape as said first housing and is axially aligned therewith, and said expansion chamber is formed by an internal extended barrier having an axial dimension equivalent to the axial length of said second housing.

3. The exhaust handling system of claim 2 wherein said second housing is enclosed by a removable external cover plate.

4. The exhaust handling system of claim 1 wherein said housings are of a non-circular configuration.

5. A tuned exhaust system for an internal combustion engine having at least one exhaust port for ejecting spent exhaust gases, said tuned exhaust system comprising:

A. a first enclosed exhaust flow channel adapted for attachment to an internal combustion engine, said first flow channel having at one end thereof an inlet port adapted for receiving exhaust gases from the exhaust port of an engine, an extended flow tube coiled in a first radial plane containing said inlet port, and an outlet port at the opposite end of said flow channel; and, B. an expansion channel attached to said first flow channel and having an extended chamber folded into a second radial plane axially displaced from said flow channel, and having an inlet opening communicating with said flow channel outlet port, and an exhaust opening located an extended distance down said expansion channel from said inlet opening and adapted to exhaust gas flow into the atmosphere.

6. The tuned exhaust system of claim 5 wherein said first flow channel is coiled upon itself in a helical configuration and said expansion channel is curved in a radial plane, with said flow channel and said expansion channels being of similar overall external dimensions.

7. The tuned exhaust system of claim 6 wherein said flow channel and said expansion channel are both contained in a cylindrical housing having planar divider walls between said channels and also planar external surfaces on each said channel.

8. The tuned exhaust system of claim 5 wherein said flow channel and said expansion channel are folded into generally rectangular shaped housings.

9. A tuned exhaust system for an internal combustion engine haying at least one exhaust port for ejecting spent exhaust gases, said tuned exhaust system comprising:

A. a first enclosed exhaust flow channel adapted for attachment to an internal combustion engine, said first flow channel having at one end thereof an inlet port adapted for receiving exhaust gases from the exhaust port of an engine, an extended flow tube coiled in a first radial plane containing said inlet port, and an outlet port at the opposite end of said flow channel;

B. an expansion channel attached to said first flow channel and having an extended chamber folded into a second radial plane axially displaced from said flow channel, and having an inlet opening communicating with said flow channel outlet port, and an exhaust opening located an extended distance down said expansion channel from said inlet opening and adapted to flow exhaust gas into the atmosphere; and, C. wherein said flew channel and said expansion channel are folded into generally rectangular shaped housings and wherein said expansion chamber contains a sell-contained chamber located therein consisting of a dead space having no communication with either channel.

\* \* \* \* \*